United States Patent
Zinchuk et al.

(10) Patent No.: US 10,528,364 B2
(45) Date of Patent: Jan. 7, 2020

(54) METHOD AND SYSTEM FOR DYNAMIC INDEXATION AND LOADING OF MODULE CODES

(71) Applicant: YANDEX EUROPE AG, Lucerne (CH)

(72) Inventors: Aleksandr Aleksandrovich Zinchuk, Moscow (RU); Sergey Sergeevich Konstantinov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 16/394,292

(22) Filed: Apr. 25, 2019

(65) Prior Publication Data

US 2019/0250931 A1    Aug. 15, 2019

Related U.S. Application Data

(63) Continuation of application No. 15/525,305, filed as application No. PCT/IB2015/058961 on Nov. 19, 2015, now Pat. No. 10,346,182.

(30) Foreign Application Priority Data

Jun. 30, 2015   (RU) .................................. 2015125960

(51) Int. Cl.
  *G06F 9/445*   (2018.01)
  *G06F 8/61*   (2018.01)
  (Continued)

(52) U.S. Cl.
  CPC ............ *G06F 9/44521* (2013.01); *G06F 8/61* (2013.01); *G06F 17/2247* (2013.01);
  (Continued)

(58) Field of Classification Search
  CPC combination set(s) only.
  See application file for complete search history.

(56) References Cited

U.S. PATENT DOCUMENTS 6,195,678 B1   2/2001   Komuro
6,629,315 B1   9/2003   Naylor
(Continued)

FOREIGN PATENT DOCUMENTS

RU      2013135237 A     2/2015

OTHER PUBLICATIONS

International Search Report with regard to PCT/IB2015/058961, dated Feb. 5, 2016.
(Continued)

*Primary Examiner* — Shean Tokuta
(74) *Attorney, Agent, or Firm* — BCF LLP

(57) ABSTRACT

Computing device and a method for loading module codes, the module codes required for executing an action, the method comprising: receiving, by the computing device, a request for executing the action, the action being executable using a first module code; acquiring, from the first predetermined index, a first module code reference indicating a first module code location and the indication that executing the first module code requires a second module code; acquiring, from a second predetermined index, a second module code reference, the second module code reference indicating a second module code location; based on the first module code reference, acquiring the first module code from the first module code location; based on the second module code reference, acquiring the second module code from the second module code location; executing the action by running the first module code and the second module code.

20 Claims, 3 Drawing Sheets

(51) Int. Cl.
  *G06F 17/22* (2006.01)
  *H04L 29/08* (2006.01)
  *G06F 16/957* (2019.01)

(52) U.S. Cl.
  CPC .......... *H04L 67/34* (2013.01); *G06F 16/9574* (2019.01); *H04L 67/10* (2013.01)

(56) References Cited

U.S. PATENT DOCUMENTS

| | | | |
|---|---|---|---|
| 7,231,644 B2 | 6/2007 | Kieffer | |
| 7,814,234 B2 | 10/2010 | Hawkins et al. | |
| 8,225,307 B2 | 7/2012 | Baker et al. | |
| 8,312,451 B2 | 11/2012 | Poole et al. | |
| 8,626,919 B1 | 1/2014 | Papakipos et al. | |
| 8,676,978 B2 | 3/2014 | Jiang et al. | |
| 8,918,873 B1* | 12/2014 | Satish | G06F 21/57 713/170 |
| 9,183,120 B1* | 11/2015 | Webb | G06F 8/60 |
| 2001/0020245 A1 | 9/2001 | Golds et al. | |
| 2002/0144250 A1 | 10/2002 | Yen | |
| 2005/0197819 A1 | 9/2005 | Hopkins et al. | |
| 2005/0262488 A1* | 11/2005 | Wagner | G06F 8/71 717/144 |
| 2007/0169108 A1 | 7/2007 | Guillorit et al. | |
| 2008/0201705 A1* | 8/2008 | Wookey | G06F 8/658 717/175 |
| 2009/0249298 A1* | 10/2009 | Blount | G06F 8/70 717/125 |
| 2009/0282403 A1 | 11/2009 | Poole et al. | |
| 2012/0036264 A1 | 2/2012 | Jiang et al. | |
| 2012/0159260 A1 | 6/2012 | Fortune et al. | |
| 2012/0226667 A1 | 9/2012 | Volvovski et al. | |
| 2013/0007221 A1 | 1/2013 | Venkat et al. | |
| 2013/0055340 A1* | 2/2013 | Kanai | G06F 21/53 726/1 |
| 2014/0013331 A1* | 1/2014 | Noro | G06F 9/50 718/103 |
| 2014/0096110 A1 | 4/2014 | Charters et al. | |
| 2014/0196022 A1* | 7/2014 | Skutin | G06F 8/61 717/176 |
| 2014/0229431 A1 | 8/2014 | Somerfield et al. | |
| 2014/0245290 A1* | 8/2014 | Gupta | G06F 8/61 717/178 |
| 2014/0359601 A1 | 12/2014 | Constable et al. | |
| 2015/0032657 A1 | 1/2015 | Boniolo et al. | |
| 2015/0033229 A1* | 1/2015 | Tegtmeier | H04L 41/145 718/1 |
| 2015/0192975 A1* | 7/2015 | Kawai | G06F 1/3203 713/323 |
| 2015/0193263 A1* | 7/2015 | Nayyar | G06Q 10/06 707/703 |
| 2015/0277957 A1* | 10/2015 | Shigeta | G06F 9/45558 718/1 |
| 2016/0261459 A1 | 9/2016 | Kamath et al. | |
| 2016/0315999 A1* | 10/2016 | Sun | H04L 67/10 |
| 2017/0242665 A1* | 8/2017 | Wang | G06F 8/71 |
| 2018/0046497 A1* | 2/2018 | Al-Jarro | G06F 9/46 |

OTHER PUBLICATIONS

International Preliminary Report on Patentability with regard to PCT/IB2015/058961, dated May 6, 2016.
English Abstract of RU2013135237 retrieved on Espacenet on Mar. 21, 2017.

* cited by examiner

METHOD AND SYSTEM FOR DYNAMIC INDEXATION AND LOADING OF MODULE CODES

CROSS-REFERENCE

The present application is a continuation of U.S. patent application Ser. No. 15/525,305, filed May 9, 2017, entitled "METHOD AND SYSTEM FOR DYNAMIC INDEXATION AND LOADING OF MODULE CODES", which is a national stage entry of International Patent Application No. PCT/IB2015/058961, filed on Nov. 19, 2015, entitled "METHOD AND SYSTEM FOR DYNAMIC INDEXATION AND LOADING OF MODULE CODES", which claims convention priority to Russian Patent Application No. 2015125960, filed Jun. 30, 2015, entitled "METHOD AND SYSTEM FOR DYNAMIC INDEXATION AND LOADING OF MODULE CODES", the entirety of all of which is incorporated herein.

FIELD OF THE TECHNOLOGY

The present technology relates to method of and system for dynamic indexation and loading of module codes.

BACKGROUND

Presently, when loading program codes on a computing device to execute an action, the server often has to upload a large number of module codes to the computing device, a portion of which module codes may not be even required to execute a specific action required by a user.

Conventionally, the modules on which a running of a computing device computer program depends, may be downloaded from a remote information storage medium (such as a server information storage medium) to a local information storage medium, either statically or dynamically.

Static loading refers to automatically loading, at the time the computer program itself is initially loaded, all modules on which the computer program is nominally dependents; that is to say, all modules which may be required by any instance of the computer program to successfully handle any potential state or circumstance which that computer program may encounter.

Dynamic loading, on the other hand, refers to loading one or more of the modules at runtime based on an explicit program instruction of the computer program. For example, a computer game which allows a user to play either a game of poker or a game of solitaire may nominally require both a poker module and a solitaire module in order to successfully handle all potential user interactions, even though the user may ultimately decide only to play poker.

Under a static loading paradigm, both the poker module and the solitaire module would be uploaded to the local information storage memory of the computing device on initial loading of the computer game. Alternatively, under a dynamic loading paradigm, the computer game could have been programmed to load neither the poker module nor the solitaire module initially, but then explicitly load the poker module when the program reaches a state wherein the user has chosen to play poker.

Static and dynamic loading each present advantages and disadvantages. In the case of static loading, the main advantage lies in the guarantee that all modules that may be needed are already available to the computing device, thus ensuring that the computer program is responsive; however, this advantage comes at the expense of a potentially extensive data transfer traffic, since all of the modules are automatically loaded, potentially including some (or many) whose program instructions are never actually executed. Conversely, dynamic loading provides the advantage of a potentially lesser traffic. However, dynamic loading still may need preloading module code indexes (maps or the tables of contents of available modules for a specific software). The whole index for a complicated apparat programming interface, for example, can be relatively large as it can depict many modules dependencies, data permissions etc.

U.S. Pat. No. 8,626,919 B1 teaches a system that executes an application. During operation, the system obtains a resource list associated with the application and stores a set of resources including a native code module from the resource list through communications over a network connection, wherein the resources are stored in persistent local storage. The application then loads the application in the web browser and loads the native code module into a secure runtime environment. Next, the application executes the application independently of the network connection using the native code module and the stored resources.

U.S. Pat. No. 8,676,978 B2 teaches a method including accessing a resource list associated with a structured document loaded by a client application executing within a client device; identifying a first set of resources referenced in the resource list that are stored within a storage space of the client device; retrieving the first set of resources from the storage space; loading the first set of resources into a model representation of the structured document generated by a client document-rendering application for rendering by the client document-rendering application; identifying a second set of resources referenced in the resource list that are not stored within the storage space of the client device; formulating and transmitting one or more requests for the second set of resources; receiving the second set of resources in response to the requests; and loading the second set of resources into the model representation for rendering by the client document-rendering application.

US 2014/0096110 A1 teaches method, system, and/or computer program product managing a set of software modules in a software runtime environment, where the set of software modules has one or more dynamic dependencies and one or more static dependencies. Each software module having a static dependency on another software module in a set of software modules is identified. Each subset of the set of software modules that is interdependent with another subset due to static dependencies between subsets is identified. In response to a change in state of a module in an identified subset, the change in state is applied to all modules in the identified subset.

SUMMARY

It is thus an object of the present technology to mitigate at least some of the inconveniences present in the prior art.

In one aspect, implementations of the present technology provide a computer-implemented method for loading module codes, the module codes required by a computing device for executing an action, the method executed on the computing device. The method comprises: receiving, by the computing device, a request for executing the action, the action being executable using a first module code, a first module code reference indicating a first module code location being recorded in a first predetermined index; acquiring, from the first predetermined index: the first module code reference, the first module code reference indicating the first module code location, and an indication that executing the first module code requires a second module code, and an indication of a second predetermined index, the second predetermined index comprising a second module code reference, the second module code reference indicating a second module code location, the second module code supporting execution of the first module code; acquiring, from the second predetermined index, the second module code reference; based on the first module code reference, acquiring the first module code from the first module code location; based on the second module code reference, acquiring the second module code from the second module code location.

In some implementations the method further comprises executing the action by running the first module code and the second module code.

In some implementations the method further comprises storing, on the computing device, an indication of the first predetermined index, the first predetermined index comprising the first module code reference, the first module code reference indicating the first module code location.

In some implementations, the first predetermined index and the second predetermined index are a part of a plurality of predetermined indexes, the plurality of predetermined indexes comprising one default index, the default index selected from: the first predetermined index and the second predetermined index, the default index being stored on a default information storage medium; and the indication of an index other than the default index is made by the indicator of that particular index other than the default index, referencing to a particular information storage medium other than the default information storage medium, and an indication of the default index is made by any one, selected from: an absence of an indicator of the predetermined index being the default index, the absence of the indicator being interpreted as a reference to the default information storage medium, and the indicator of that predetermined index being the default index, referencing to the default information storage medium.

In some implementations, the first predetermined index is any one, selected from: a remotely stored first predetermined index, and a locally stored at least a portion of the first predetermined index; and the second predetermined index is any one, selected from: a remotely stored second predetermined index, and a locally stored at least a portion of the second predetermined index.

In some implementations, the locally stored at least the portion of the first predetermined index is any one, selected from: a modified version of at least the portion of the remotely stored first predetermined index and an exact copy of at least the portion of the remotely stored first predetermined index; and the locally stored at least the portion of the second predetermined index is any one, selected from: a modified version of at least the portion of the remotely stored second predetermined index and an exact copy of at least the portion of the remotely stored second predetermined index.

In some implementations, before acquiring from at least the portion of the first predetermined index any one of (i) the first module code reference, and (ii) the indication of the second predetermined index, the method further comprises performing a verification whether the locally stored at least the portion of the first predetermined index is available; and responsive to the locally stored at least the portion of the first predetermined index being available, the method further comprises using, by the computing device, one of: (i) the remotely stored first predetermined index and (ii) the locally stored at least the portion of the first predetermined index, as a source of at least one, selected from: the first module code reference, the indication of the second predetermined index; and responsive to the locally stored at least the portion of the first predetermined index being not available, the method further comprises using, by the computing device, the remotely stored first predetermined index as a source of the first module code reference and of the indication of the second predetermined index.

In some implementations, responsive to the locally stored at least the portion of the first predetermined index being available, the using of one of: (i) the remotely stored first predetermined index and (ii) the locally stored at least the portion of the first predetermined index, is performed after selecting respective one of: (i) the remotely stored first predetermined index and (ii) the locally stored at least the portion of the first predetermined index, the selecting being executed by steps of: determining a staleness parameter of the locally stored at least the portion of the first predetermined index, comparing the staleness parameter of the locally stored at least the portion of the first predetermined index with a predetermined staleness threshold parameter, the predetermined staleness threshold parameter indicative whether a locally stored at least portion of a respective index is stale, and responsive to the staleness parameter of the locally stored at least the portion of the first predetermined index exceeding the predetermined staleness threshold parameter, using the remotely stored first predetermined index as the source of at least one, selected from: the first module code reference and the indication of the second predetermined index; and responsive to the staleness parameter of the locally stored at least the portion of the first predetermined index being below the predetermined staleness threshold parameter, using the locally stored at least the portion of the first predetermined index as the source of at least one, selected from: the first module code reference and the indication of the second predetermined index.

In some implementations, the first module code location is any one, selected from: a local information storage medium and a remote information storage medium, and the second module code location is any one, selected from: a local information storage medium and a remote information storage medium.

In some implementations, the second module code location is the remote information storage medium, after acquiring the second module code from the second module code location, the method further comprises: responsive to determining that at least the portion of the second predetermined index is stored locally, modifying the locally stored at least the portion of the second predetermined index such that the modified locally stored at least the portion of the second predetermined index comprises the second module code reference indicating a second module code location on the local information storage medium, and responsive to determining the absence of the locally stored at least the portion of the second predetermined index, generating the modified version of at least the portion of the remotely stored second predetermined index, the modified version of at least the portion of the remotely stored second predetermined index comprising the second module code reference indicating the second module code location on the local information storage medium.

In some implementations, the first predetermined index and the second predetermined index are implemented as a single third predetermined index, and acquiring from any one, selected from: at least the portion of the first predetermined index and at least the portion of the second predetermined index, is acquiring from at least a portion of the third predetermined index.

In some implementations, the third predetermined index is any one, selected from: a remotely stored the third predetermined index, and a locally stored at least a portion of the third predetermined index.

In some implementations, the locally stored at least the portion of the third predetermined index is any one, selected from: a modified version of at least the portion of the remotely stored the third predetermined index, and an exact copy of at least the portion of the remotely stored the third predetermined index.

In some implementations receiving, by the computing device, the request for the executing the action, is receiving the request initiated by a third module code.

In some implementations, the computing device is associated with a user, and receiving, by the computing device, the request for the executing the action, is receiving from the user.

In yet another aspect, implementations of the present technology provide a computing device. The computing device includes an information storage medium. The computing device includes a processor coupled to the information storage medium. The processor is configured to have access to computer readable commands which commands, when executed, cause the processor to perform: receiving, by the computing device, a request for executing the action, the action being executable using a first module code, a first module code reference indicating a first module code location being recorded in a first predetermined index; acquiring, from the first predetermined index: the first module code reference, the first module code reference indicating the first module code location, and an indication that executing the first module code requires a second module code, and an indication of a second predetermined index, the second predetermined index comprising a second module code reference, the second module code reference indicating a second module code location, the second module code supporting execution of the first module code; acquiring, from the second predetermined index, the second module code reference; based on the first module code reference, acquiring the first module code from the first module code location; based on the second module code reference, acquiring the second module code from the second module code location.

In some implementations, the processor is further configured to execute the action by running the first module code and the second module code.

In some implementations, the processor is further configured to store, on the computing device, an indication of the first predetermined index, the first predetermined index comprising the first module code reference, the first module code reference indicating the first module code location.

In some implementations, the first predetermined index and the second predetermined index are a part of a plurality of predetermined indexes, the plurality of predetermined indexes comprising one default index, the default index selected from: the first predetermined index and the second predetermined index, the default index being stored on a default information storage medium; and the indication of an index other than the default index is made by the indicator of that particular index other than the default index, referencing to a particular information storage medium other than the default information storage medium, and an indication of the default index is made by any one, selected from: an absence of an indicator of the predetermined index being the default index, the absence of the indicator being interpreted as a reference to the default information storage medium, and the indicator of that predetermined index being the default index, referencing to the default information storage medium.

In some implementations, the first predetermined index is any one, selected from: a remotely stored first predetermined index, and a locally stored at least a portion of the first predetermined index, and the second predetermined index is any one, selected from: a remotely stored second predetermined index, and a locally stored at least a portion of the second predetermined index.

In some implementations, the locally stored at least the portion of the first predetermined index is any one, selected from: a modified version of at least the portion of the remotely stored first predetermined index and an exact copy of at least the portion of the remotely stored first predetermined index, and the locally stored at least the portion of the second predetermined index is any one, selected from: a modified version of at least the portion of the remotely stored second predetermined index and an exact copy of at least the portion of the remotely stored second predetermined index.

In some implementations, the processor is further configured, before acquiring from at least the portion of the first predetermined index any one of (i) the first module code reference, and (ii) the indication of the second predetermined index, to perform a verification whether the locally stored at least the portion of the first predetermined index is available; and responsive to the locally stored at least the portion of the first predetermined index being available, to use one of: (i) the remotely stored first predetermined index and (ii) the locally stored at least the portion of the first predetermined index, as a source of at least one, selected from: the first module code reference, the indication of the second predetermined index; and responsive to the locally stored at least the portion of the first predetermined index being not available, to use the remotely stored first predetermined index as a source of the first module code reference and of the indication of the second predetermined index.

In some implementations, responsive to the locally stored at least the portion of the first predetermined index being available, the using of one of: (i) the remotely stored first predetermined index and (ii) the locally stored at least the portion of the first predetermined index, is performed after selecting respective one of: (i) the remotely stored first predetermined index and (ii) the locally stored at least the portion of the first predetermined index, the selecting being executed by steps of: determining a staleness parameter of the locally stored at least the portion of the first predetermined index, comparing the staleness parameter of the locally stored at least the portion of the first predetermined index with a predetermined staleness threshold parameter, the predetermined staleness threshold parameter indicative whether a locally stored at least portion of a respective index is stale, and responsive to the staleness parameter of the locally stored at least the portion of the first predetermined index exceeding the predetermined staleness threshold parameter, using the remotely stored first predetermined index as the source of at least one, selected from: the first module code reference and the indication of the second predetermined index; and responsive to the staleness parameter of the locally stored at least the portion of the first predetermined index being below the predetermined staleness threshold parameter, using the locally stored at least the portion of the first predetermined index as the source of at least one, selected from: the first module code reference and the indication of the second predetermined index.

In some implementations, the first module code location is any one, selected from: a local information storage medium and a remote information storage medium, and the second module code location is any one, selected from: a local information storage medium and a remote information storage medium.

In some implementations, the second module code location is the remote information storage medium, after acquiring the second module code from the second module code location, the processor is further configured: responsive to determining that at least the portion of the second predetermined index is stored locally, to modify the locally stored at least the portion of the second predetermined index such that the modified locally stored at least the portion of the second predetermined index comprises the second module code reference indicating a second module code location on the local information storage medium, and responsive to determining the absence of the locally stored at least the portion of the second predetermined index, to generate the modified version of at least the portion of the remotely stored second predetermined index, the modified version of at least the portion of the remotely stored second predetermined index comprising the second module code reference indicating the second module code location on the local information storage medium.

In some implementations, the first predetermined index and the second predetermined index are implemented as a single third predetermined index, and acquiring from any one, selected from: at least the portion of the first predetermined index and at least the portion of the second predetermined index, is acquiring from at least a portion of the third predetermined index.

In some implementations, the third predetermined index is any one, selected from: a remotely stored the third predetermined index, and a locally stored at least a portion of the third predetermined index.

In some implementations, the locally stored at least the portion of the third predetermined index is any one, selected from: a modified version of at least the portion of the remotely stored the third predetermined index, and an exact copy of at least the portion of the remotely stored the third predetermined index.

In some implementations, receiving, by the computing device, the request for the executing the action, is receiving the request initiated by a third module code.

In some implementations, the computing device is associated with a user, and receiving, by the computing device, the request for the executing the action, is receiving from the user.

In the context of the present specification, unless specifically provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, the expression "information" includes information of any nature or kind whatsoever, comprising information capable of being stored on an information storage medium. Thus information includes, but is not limited to indexes of any kind, databases, arrays of information, files of any kind, audiovisual works (photos, movies, sound records, presentations etc.), data (map data, location data, numerical data, etc.), text (opinions, comments, questions, messages, etc.), documents, spreadsheets, etc.

In the context of the present specification, unless specifically provided otherwise, the expression "component" is meant to include software (appropriate to a particular hardware context) that is both necessary and sufficient to achieve the specific function(s) being referenced.

In the context of the present specification, unless specifically provided otherwise, the expression "information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless specifically provided otherwise, the word "module code" is a computer executable program code designed to perform a particular task. To perform that particular task, the module code may require one or more other module codes. For example, to perform a particular task, the first module code may require the use of the second module code. Several module codes can be stored on the same information storage medium or on different information storage mediums. Information storage mediums can be parts of servers or other computing devices. It is possible, for example, that the first module code is stored on the computing device's information storage mediums, and the second module code is stored on a server's information storage mediums. Further, it is possible, that both the first and the second module codes are stored either on the information storage medium(s) of the one server, or on two or more different information storage mediums of two different servers.

In the context of the present specification, unless specifically provided otherwise, the expression "predetermined index" designates a module code index comprising one module code reference or plurality of module code references, module code references indicating module code locations on one or on several information storage mediums. A predetermined index can be implemented, as non-limiting examples, as a map or the table of contents, a set of resource references, etc. A predetermined index can be a part of a plurality of predetermined indexes. Different predetermined indexes can be stored on one or several information storage mediums. For example, a first predetermined index can be stored on a first information storage medium on a first server, and the second predetermined index can be stored also on the first information storage medium on the first server, or can be stored on the second information storage medium on the second server. The word "predetermined" in the expression "predetermined index" is intended to connote, that a user request for executing an action, the action being executable using a particular module code, can indicate a specific, i.e. predetermined, index from plurality of indexes, which predetermined index comprises a reference to that particular module code. The predetermined index can also comprise an indication that executing that particular module code requires a second module code. In that case, the predetermined index can comprise reference to the second module code, or, if there is no reference to the second module code in that predetermined index, the predetermined index can comprise an indication of a second predetermined index, the second predetermined index comprising the second module code reference. Predetermined indexes, or their parts, can be downloaded by computing devices and stored on local information storage mediums. Locally stored at least parts of predetermined indexes can be modified by computing devices to reflect the fact that a local copy of a module code is available, such that locally stored at least parts of predetermined indexes can comprise references to locally stored and/or remotely stored module codes.

In the context of the present specification, unless specifically provided otherwise, the expression "module code reference" designates a reference indicating location of a particular module code on a particular information storage medium.

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first predetermined index" and "third predetermined index" is not intended to imply any particular order, type, chronology, hierarchy or ranking (for example) of/between the predetermined indexes, nor is their use (by itself) intended imply that any "second predetermined index" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
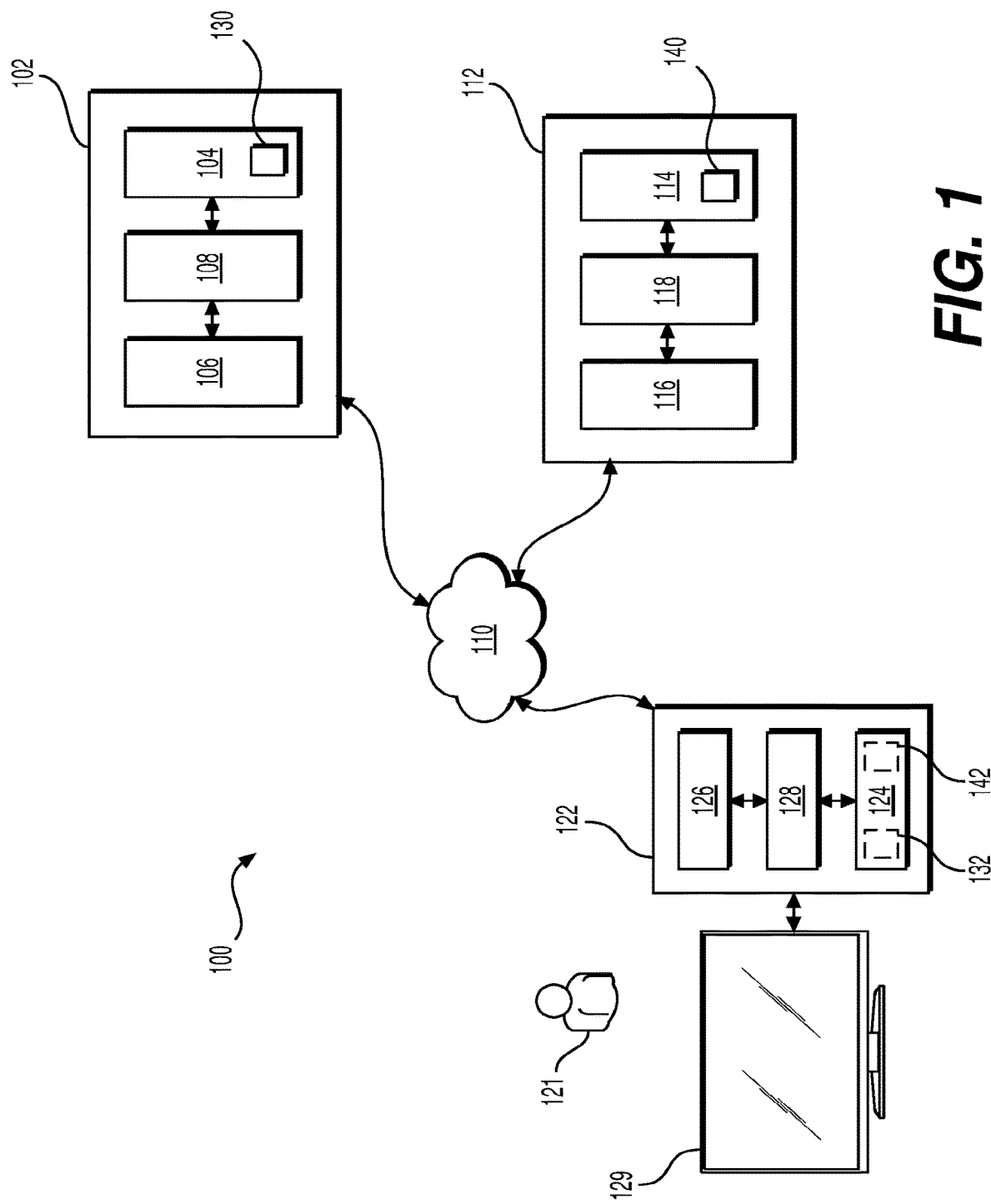
FIG. 1 is a schematic diagram of a system being implemented according with non-limiting embodiments of the present technology.

Referring to FIG. 1, there is shown a diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

System 100 includes a first remote computing device being in this implementation a first server 102. The first server 102 may be implemented as a conventional computer server. In an example of an embodiment of the present technology, the first server 102 may be implemented as a Dell™ PowerEdge™ Server running the Microsoft™ Windows Server™ operating system. Needless to say, the first server 102 may be implemented in any other suitable hardware and/or software and/or firmware or a combination thereof. In the depicted non-limiting embodiment of present technology, the first server 102 is a single server. In alternative non-limiting embodiments of the present technology, the functionality of the first server 102 may be distributed and may be implemented via multiple servers.

The implementations of the first server 102 are well known in the art. So, suffice it to state, that the first server 102 comprises inter alia a network communication interface 106 (such as a modem, a network card and the like) for two-way communication over a communication network 110; and a processor 108 coupled to the network communication interface 106 and an information storage medium 104, the processor 108 being configured to execute various routines, including those described herein below. To that end the processor 108 may have access to computer readable instructions stored on the information storage medium 104, which instructions, when executed, cause the processor 108 to execute the various routines described herein.

The first server 102 includes the information storage medium 104 that may be used by the first server 102. Generally, the information storage medium 104 may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof. The information storage medium 104 is configured to store information, including computer-readable instructions and other data, including, as a non limiting examples, module codes and predetermined indexes.

Figure 3:
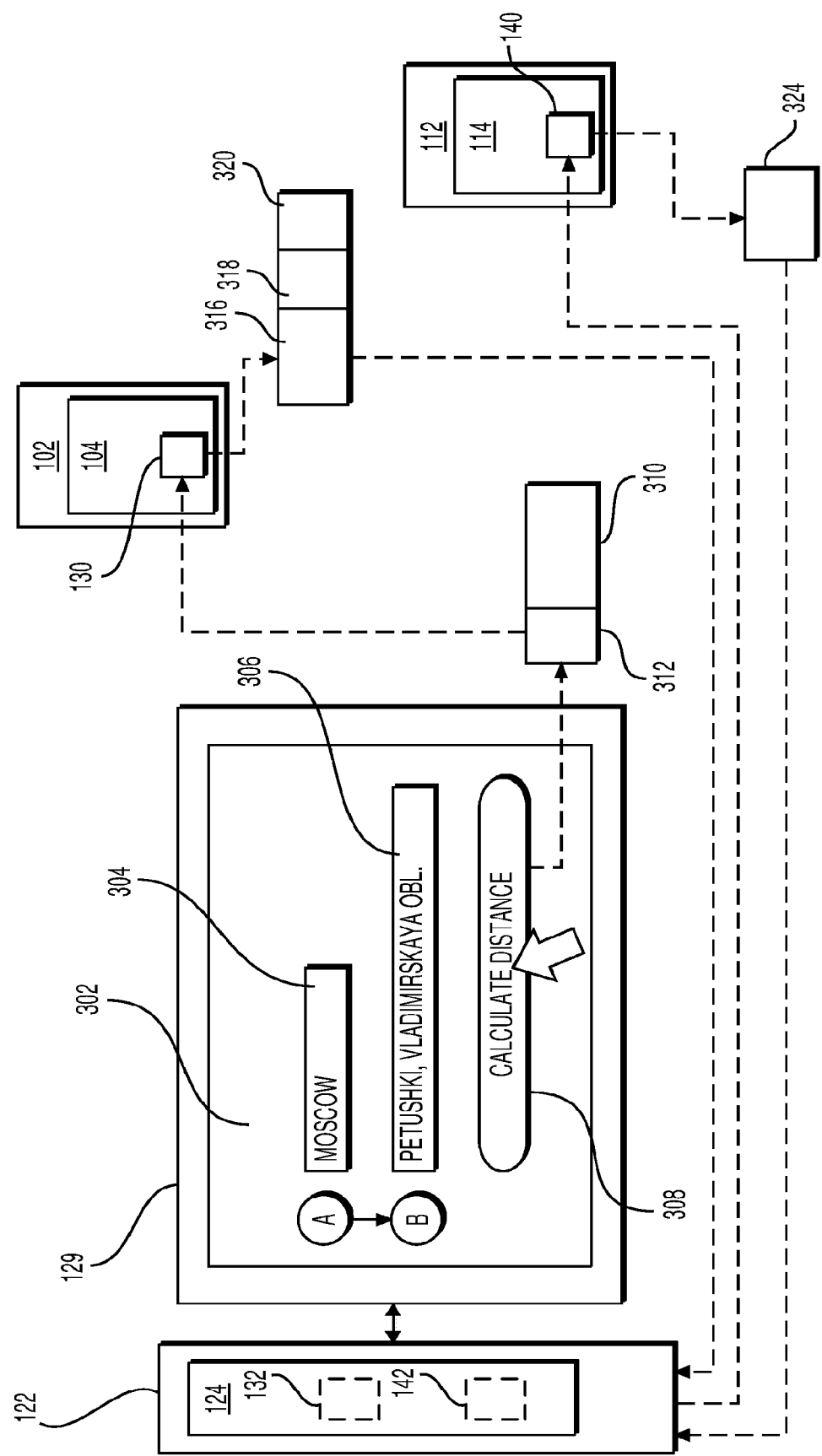
FIG. 3 is a schematic diagram of a graphical user interface and an illustration of certain aspects of method, both schematic diagram of a graphical user interface and an illustration of certain aspects of the method of FIG. 2, the method being implemented according with other non-limiting embodiments of the present technology.

The information storage medium 104 can store a first predetermined index 130, depicted in FIG. 1 and in FIG. 3. The first predetermined index 130 is an index comprising plurality of module code references, including a first module code reference 316, the first module code reference 316 indicating a first module code location. The first module code location can be any information storage medium; it includes but is not limited to a location on the information storage memory 104.

The first predetermined index 130 can further comprise a list of dependencies indicating that execution of a module code, which is referenced in the first predetermined index 130, requires another module code. The first predetermined index 130 can comprise the indication 318 that executing the first module code requires a second module code (indication 318 depicted in FIG. 3), and an indication 320 of a second predetermined index, the second predetermined index 140 comprising a second module code reference 324, the second module code reference 324 indicating a second module code location, the second module code supporting execution of the first module code The first predetermined index 130 can be a part of a plurality of predetermined indexes. Different predetermined indexes can be stored on one or several information storage mediums. For example, the first predetermined index 130 and the second predetermined index 140 can be both stored on a single information storage medium on a remote computing device, such as a server, or can be stored on different information storage mediums. By the same token, the information storage medium 104 can store more than one predetermined index.

The information storage medium 104 can store computer-readable instructions that manage control, downloading, updates, populating and modifications of predetermined indexes, as well as uploading to other computing devices. More specifically, computer-readable instructions, stored on the information storage medium 104, can cause the processor 108 to index module code locations and to store information about module codes dependencies.

More specifically, computer-readable instructions stored on the information storage medium 104 can cause the processor 108 to receive module codes, to store module codes, to store information about module code dependencies. Module code dependencies can exist when a supporting module code is needed for executing a primary module code. The information storage medium 104 can store more than one module code.

The information storage medium 104 can store computer-readable instructions that, when executed, cause the processor 108 to receive a request for executing an action, the action being executable using at least one module code (the first module code). The request for executing the action can be received, for example, from another module code. As another example, the request for executing the action can be received, for example, from a computing device 122 over the communication network 110. The computing device 122, which will be described in more details below, can send the request for executing the action responsive to receiving an indication of a user 121 of the computing device 122 desire to perform the action.

Stored on the information storage medium 104 computer-readable instructions, when executed, can further cause the processor 108, responsive to receiving the request for executing the action, to send to the computing device 122 a first module code reference indicating a first module code location. A processor 128 of the computing device 122 can retrieve the first module code reference from a respective predetermined index (the first predetermined index 130).

Execution of the first module code may be supported or enabled by another module code (the second module code). If this is the case, computer-readable instructions can cause the processor 108 to check if the first predetermined index 130 comprises the second module code reference 324, the second module code reference 324 indicating a second module code location. Responsive to the first predetermined index 130 comprising the second module code reference 324, the computer-readable instructions, when executed, can cause the processor 108 to send the second module code reference 324 to the computing device 122. Responsive to the first predetermined index 130 not comprising the second module code reference 324, the computer-readable instructions, when executed, can cause the processor 108 to send to the computing device 122 an indication 318 that executing the first module code requires the second module code. Further, the computer-readable instructions can cause the processor 108 to send an indication 320 of the second predetermined index 140, the second predetermined index 140 comprising second module code reference 324, the second module code reference 324 indicating the second module code location. Both the second predetermined index 140 and the second module code do not need to be stored on the same information storage medium 104, as the first predetermined index 130 and the first module code. For example, the second module code and the second predetermined index 140 can be stored on an information storage medium 114 of a second server 112, also depicted in FIG. 1.

System 100 further includes a second remote computing device being in this implementation a second server 112. The second server 112 may be implemented as a conventional computer server, similar to the first server 102, comprising a network communication interface 116, an information storage medium 114, and a processor 118, Therefore, the second server 112 will not be described in any details. It will be mentioned only, that the second server 112 can store similar information, including program instructions, predetermined indexes, module codes etc. The information storage medium 114 comprises, inter alia, the second predetermined index 140, the second predetermined index 140 comprising second module code reference 324, the second module code reference 324 indicating the second module code location. The second predetermined index 140 can be implemented substantially similarly to the first predetermined index 130. The information storage medium 114 can store plurality of module codes, including the second module code. The information storage medium 114 can store more than one predetermined index and/or more than one module code.

The first server 102 and the second server 112, depicted in FIG. 1, are interconnected via the communication network 110. In some non-limiting embodiments of the present technology, the communication network 110 can be implemented as the Internet. In other embodiments of the present technology, the communication network 110 can be implemented differently, such as any wide-area communication network, local-area communication network, a private communication network and so on.

System 100 further includes the computing device 122. The computing device 122 can be associated with the user 121. The user 121 can perform actions which can be interpreted by the computing device 122 as the request for the executing the action. It should be noted that the fact that the computing device 122 can be associated with the user 121 does not need to suggest or imply any specific mode of operation.

The computing device 122 can be implemented as Dell™ Precision T1700 MT CA033PT170011RUWS PC with Intel® Xeon™ processor 128, CPU frequency 3300 MHz, video card nVIDIA Quadro K2000, running the Windows 7® Pro 64-bit operating system, an information storage medium 124, a network communication interface 126 (such as a modem, a network card and the like) for two-way communication over a communication network 110. The processor 128 is coupled to the network communication interface 126 and to the information storage medium 124. However, as those skilled in the art will understand, the implementation of the computing device 122 is not particularly limited. The computing device 122 may be implemented as a personal computer (desktops, laptops, netbooks, etc.), a wireless communication device (a cell phone, a smartphone, a tablet and the like), as well as other equipment.

The computing device 122 is coupled to the communication network 110 via a communication link (not separately numbered). In some non-limiting embodiments of the present technology, the communication network 110 can be implemented as the Internet. In other embodiments of the present technology, the communication network 110 can be implemented differently, such as any wide-area communications network, local-area communications network, a private communications network and the like.

How the communication link is implemented is not particularly limited and will depend on how the computing device 122 is implemented. Merely as an example and not as a limitation, in those embodiments of the present technology where the computing device 122 is implemented as a wireless communication device (such as a smartphone), the communication link can be implemented as a wireless communication link (such as but not limited to, a 3G communications network link, a 4G communications network link, a Wireless Fidelity, or WiFi® for short, Bluetooth® and the like). In those examples, where the computing device 122 is implemented as a notebook computer, the communication link can be either wireless (such as the Wireless Fidelity, or WiFi® for short, Bluetooth® or the like) or wired (such as an Ethernet based connection).

It should be expressly understood that implementations for the computing device 122, the communication link and the communication network 110 are provided for illustration purposes only. As such, those skilled in the art will easily appreciate other specific implementation details for the computing device 122, the communication link and the communication network 110. As such, by no means, examples provided herein above are meant to limit the scope of the present technology.

The computing device 122 can establish connections, through the communication network 110, with other devices, such as servers. The computing device 122 can be connected to the first server 102 and to the second server 112 through the communication network 110.

The computing device 122 comprises a user input device (not depicted). How the user input device is implemented is not particularly limited and may depend on how the computing device 122 is implemented. The user input device may include any mechanism for providing user input to the processor 128. The user input device can be a keyboard, or a mouse, and so on. The input device is not limited to any specific input methodology, but could be arranged by a virtual button on a touch-screen display or a physical button on the cover of the electronic device, for instance. The input provided to the processor 128 can be the user's 121 request for executing the action.

Merely as an example and not as a limitation, in those embodiments of the present technology where the computing device 122 is implemented as a wireless communication device (such as a smartphone), user input device can be implemented as an optical interference based user input device. The user input device of one example is a finger/object movement sensing device on which a user performs a gesture and/or presses with a finger. The user input device can identify/track the gesture and/or determines a location of a user's finger on the user input device.

The user input device is communicatively coupled to the processor 128 and transmits input signals based on various forms of user input for processing and analysis by processor 128.

The computing device 122 further comprises a display screen 129. The display screen 129 can be implemented as a 21.5" Dell™ E2214H 2214-7803, 1920×1080 screen resolution. The display screen 129 is communicatively coupled to processor 128 and receives signals from the processor 128.

In alternative implementations of the present technology, the display screen 129 can be liquid crystal display (LCD), light emitting diode (LED), interferometric modulator display (IMOD), or any other suitable display technology. Display screen 129 can also be touch based devices such as touch screen. A touch screen is a display that detects the presence and location of user touch inputs. Display screen 129 can also be dual touch or multi-touch displays that can identify the presence, location and movement of a touch inputs. In the instances where the display screen 129 is implemented as a touch based device such as touch screen, or multi-touch display, the display screen 129 can execute functions of the user input device. In instances where display screen 129 is implemented as a touch based device such as touch screen, or multi-touch display, the display screen 129 can also transmit input signals based on various forms of user input for processing and analysis by processor 128.

The display screen 129 is generally configured to display a graphical user interface (GUI) 302, depicted in FIG. 3, that provides a visual interface between the user 121 of the computing device 122, as well as the operating system or application(s) running on the computing device 122. Generally, the GUI 302 presents programs, files and operational options with graphical images and/or text. The GUI 302 enables the user 121 making the request for executing the action. The request can be made, for example, via the input device, by clicking by the user 121 a GUI element 308 (depicted in FIG. 3), which click can trigger processor 128 to send to the first server 102 the request for executing the action, the action being executable using the first module code. The choice of the first server 102 as a server to address can be pre-programmed and be associated to a particular GUI element 308 (a first GUI element 308) by linking the first GUI element 308 with an indication 310 that executing the action requires a first module code, and with an indication 312 of the first predetermined index 130, the first predetermined index 130 comprising the first module code reference 316.

The computing device 122 further includes an information storage medium 124 being implemented as a 500 Gb hard drive, and as 8 GB (2×4 GB) 1600 MHz DDR3 Non-ECC. As those skilled in the art will understand, the information storage medium 124 can be implemented as information storage medium of any nature and kind whatsoever, including RAM, ROM, disks (CD-ROMs, DVDs, floppy disks, hard drivers, etc.), USB keys, solid state-drives, tape drives, etc. and combination thereof. The information storage medium 124 is configured to store information, including computer-readable instructions and other data, including, as a non limiting examples, module codes and at least parts of predetermined indexes.

Predetermined indexes can be downloaded by the computing device 122 and stored on the local information storage medium 124. Locally stored predetermined indexes (which can be a partial copy or a complete copy of a remotely stored predetermined index) can be modified by the processor 128 to reflect the fact that a local copy of a module code is available, such that locally stored predetermined indexes can comprise references to locally stored and/or remotely stored module codes. For example, the information storage medium can locally store at least a portion 132 of the first predetermined index 130 and/or at least a portion 142 of the second predetermined index 140.

The program instructions, stored on the information storage medium 124, can cause the processor 128 to modify already stored at least a portion 132 of the first predetermined index 130 and/or at least a portion 142 of the second predetermined index 140, to reflect the fact that some modules codes are stored locally on the information storage medium 124. If at least a portion 132 of the first predetermined index 130 and/or at least a portion 142 of the second predetermined index 140 is not already stored on the information storage medium 124, the program instructions can cause the processor 128 to generate and to store at least a portion 132 of the first predetermined index 130 and/or at least a portion 142 of the second predetermined index 140, to reflect the fact that some modules codes are stored locally on the information storage medium 124.

The information storage medium 124 can store program instructions which, when executed, cause the processor 128 to receive, via input device, user's 121 request for executing the action.

The information storage medium 124 can store program instructions which, when executed, cause the processor 128 to receive request for executing the action from a third module code. For example, a running on the computing device 122 program can request executing the action.

The information storage medium 124 can store program instructions which, when executed, cause the processor 128 to acquire, from the first predetermined index 130 the first module code reference, the first module code reference indicating the first module code location, and the indication 318 that executing the first module code requires a second module code. Furthermore, the program instructions can cause the processor 128 to acquire, from the first predetermined index 130, an indication 320 of the second predetermined index 140, the second predetermined index 140 comprising a second module code reference 324, the second module code reference 324 indicating a second module code location, the second module code supporting execution of the first module code. In other words, program instructions can cause the processor 128 to acquire from the first predetermined index 130: the first code location and the indication 320 of the second predetermined index 140, from which the processor 128 can acquire the second module code location. Having the first module code location and the second module code location, the processor 128 can retrieve the first module code and the second module code from their respective locations. It is also possible, that executing the second module code may be supported or enabled by a fourth module code. In such scenario, the processor 128 can retrieve from the second predetermined index 140 not only the second module code reference 324, but also an indication of a fourth predetermined index, the fourth predetermined index comprising a fourth module code reference, the fourth module code reference indicating a fourth module code location, the fourth module code supporting execution of the second module code. Thus, the chain of requests is possible, where execution of one module code needs support of another module code, and so on.

It is also possible that the first predetermined index 130 comprises the fourth module code reference. In such a scenario, the processor 128 can retrieve from the second predetermined index 140 not only the second module code reference 324, but also an indication 312 of the first predetermined index 130, the first predetermined index 130 comprising a fourth module code reference, the fourth module code reference indicating a fourth module code location, the fourth module code supporting execution of the second module code.

The information storage medium 124 can store computer-readable instructions that manage downloading, executing and storing module codes. More specifically, computer-readable instructions stored on the information storage medium 124 can cause the processor 128 to receive module codes, to execute module codes, to store module codes on the information storage medium 124, and to store information about module code dependencies on the information storage medium 124. Having retrieved the first module code and/or the second module code and or fourth module code, the processor 128 can store one or all of them on the information storage medium 124.

The processor 128 can execute module codes.

Figure 2:
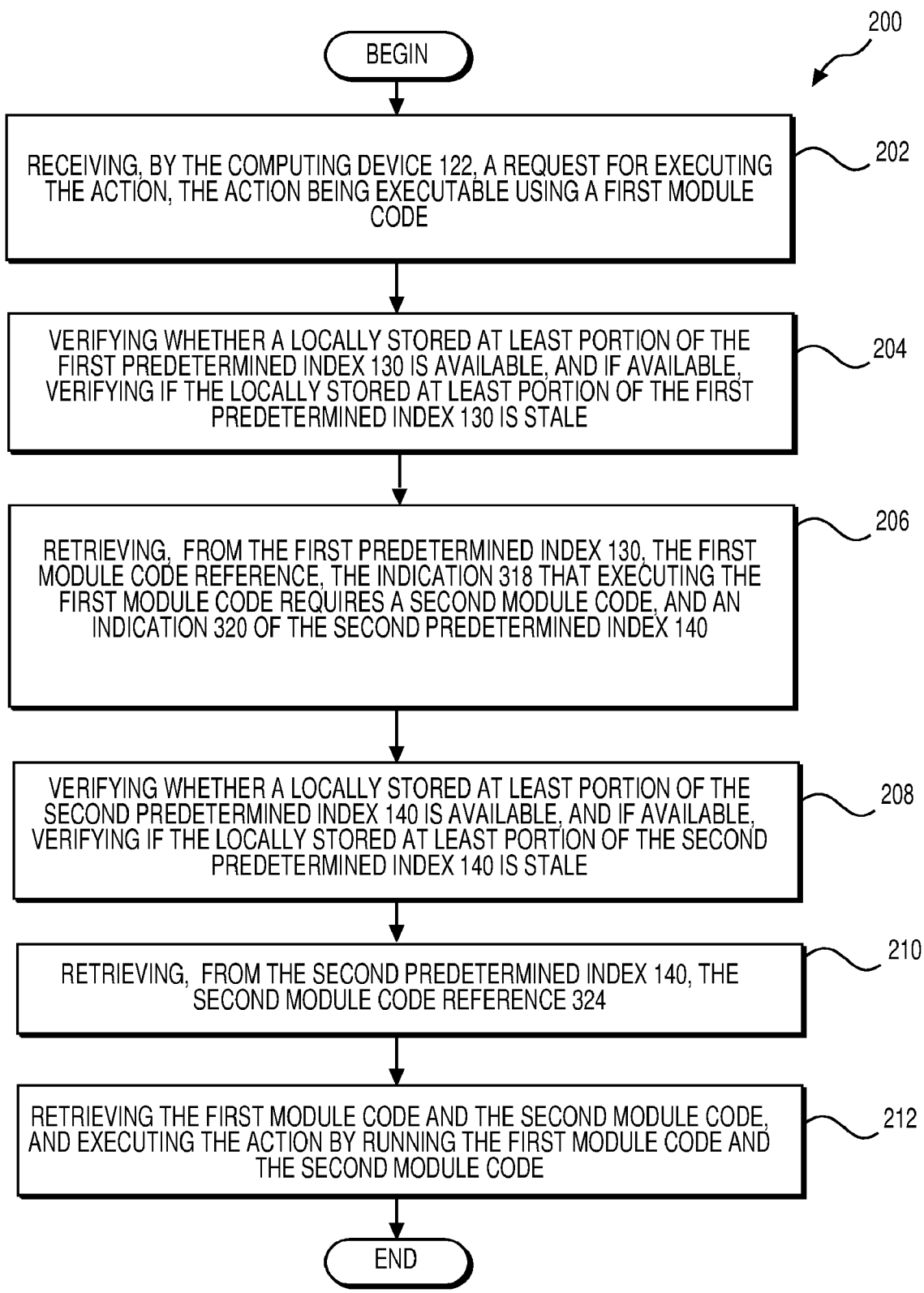
FIG. 2 depicts a block-diagram of a computer-implemented method for loading module codes, the module codes required by a computing device for executing an action, the method being implemented according with non-limiting embodiments of the present technology.

FIG. 2 depicts a block-diagram of a computer-implemented method 200 for loading module codes and executing an action, the method 200 being executable on the computing device 122 of the system 100 of FIG. 1, the method 200 being implemented according with non-limiting embodiments of the present technology.

For illustrative purposes, explanation of steps of the method 200 will be supported by referencing to a schematic diagram of the graphical user interface 302 and illustrations explaining certain aspects of method 200, being depicted in FIG. 3. The method 200 is implemented according to non-limiting embodiments of the present technology. The method 200 is the method for loading module codes, the module codes required by the computing device 122 for executing an action.

The method 200 can be executed, for example, when in order to perform an action, the computing device 122 may need two or more module codes. To perform the action, the computing device 122 may need to download module codes. In many instances, a first remote service provider stores its respective module codes on a first server 102. The first server 102 also can store a first predetermined index 130 which comprises references to all or some module codes stored on the same first server 102. However, in many instances, other service providers can add additional functionality to services provided by the first remote service provider. For example, a second service provider can provide additional functions to the services provided by the first remote service provider. The second service provider can store its module codes, which can add additional functionality to the first remote service provider's services, on its own second server 112. This second server 112 can also store the second predetermined index 140 which can comprise references to all or some module codes stored on the second server 112. At the same time, the first service provider can additionally store information that its particular modules can be executed with support of the second service provider module codes. To get module codes from the first server 102, the computing device 122 can obtain respective location information from the first predetermined index 130. To enable the computing device 122 to find these supportive module codes, the first server 102 can have stored information that supportive module codes are available on the second server 112, and that their location can be found in a respective second predetermined index 140, stored on the second server 112. Since the computing device 122 may have already downloaded necessary data (such as module codes or predetermined indexes), the computing device 122 may before contacting a respective server, to check if necessary information is available locally and if locally stored information is stale.

Step 202—receiving, by the computing device 122, a request for executing the action, the action being executable using a first module code The method 200 starts at step 202, where the computing device 122 receives a request for executing the action, the action being executable using a first module code. Request can be received from a user 121 or from a third module code.

The third module code can be, for example, any module running on the computing device 122, execution of the third module code being supported by the first module code.

If the request is received from the user 121, such a request can be made, for example, via the input device, by clicking by the user 121 a GUI element 308 (depicted in FIG. 3), which click can trigger processor 128 to send to the first server 102 the request for executing the action, the action being executable using the first module code. The choice of the first server 102 as a server to address can be pre-programmed and be associated to a particular GUI element 308 (a first GUI element 308) by linking the first GUI element 308 with an indication 312 of the first predetermined index 130, the first predetermined index 130 comprising the first module code reference 316. The indication 312 of the first predetermined index 130 can be implemented in various ways. One option, for example, is that the indication of a predetermined index is made by the indicator of that particular index, referencing to a particular information storage medium. Other non-limiting option is that one predetermined index is designated to be a default index, so that in absence of the indicator of a particular predetermined index, the processor 128 addresses to the default index, which can be stored in persistent remote or local information storage medium.

To illustrate the above, FIG. 3 depicts the display screen 129 displaying the graphical user interface (GUI) 302. In this implementation, the GUI 302 is the GUI of the on-line map service provided by Yandex™. The user 121 wants to calculate distance between Moscow, Russia, and Petushki, Vladimir region, Russia. The user 121 enters the word "Moscow" in a departure field 304 of the GUI 302, and enters the words "Petushki, Vladimirskaya obl." into a destination field 306 of the GUI 302. Then, the user 121 makes a request to calculate the distance via the input device, by clicking a GUI element 308 "calculate distance" (depicted in FIG. 3). The click triggers processor 128 to send to the first server 102 the request for executing the action, the action being executable using the first module code. The choice of the first server 102 as a server to address, in this implementation, is pre-programmed and associated to the GUI element 308 "calculate distance" by associating the first GUI element 308 with an indication 312 of the first predetermined index 130.

If the request is received from the third module code, the third module code can comprise the indication 312 to address the first predetermined index 130 stored on the first server 102. The indication 312 of the first predetermined index 130 can be implemented as it was described above.

In the case when one predetermined index is designated to be the default index, all other predetermined indexes, other than the default index, can be indicated using indicators of these indexes.

Step 204—verifying whether a locally stored at least portion of the first predetermined index 130 is available, and if available, verifying if the locally stored at least portion of the first predetermined index 130 is stale Responsive to receiving the request for executing the action, the action being executable using the first module code, the processor 128 of the computing device 122 checks if a locally stored at least portion of the first predetermined index 130 is available.

If locally stored at least portion of the first predetermined index 130 is available, the processor 128 checks whether the locally stored at least portion of the first predetermined index 130 is stale or not. To perform verification, the processor 128 retrieves from the information storage medium 124 the predetermined staleness threshold parameter indicating how long a locally stored at least portion of a predetermined index, including the first predetermined index 130, is deemed to be not stale. Processor 128 also checks a time stamp of a locally stored at least portion of the first predetermined index 130, indicating time of storing on the local information storage memory 124. Comparing time stamp with the predetermined staleness threshold parameter, the processor 128 can establish that the locally stored at least portion of the first predetermined index 130 is stale or not. For example, the predetermined staleness threshold parameter can indicate that a locally stored at least portion of a predetermined index is not stale within 2 hours from the time of storing on the local information storage medium 124. If the time stamp of the locally stored at least portion of the first predetermined index 130 indicates that it was stored locally 7 hours ago, it is stale. In contrast, if it was locally stored 47 second ago, it is not stale.

Then, the method 200 proceeds to the step 206.

Step 206—retrieving, from the first predetermined index 130, the first module code reference, the indication 318 that executing the first module code requires a second module code, and an indication 320 of the second predetermined index 140

If locally stored at least portion of the first predetermined index 130 is available, the processor 128 addresses the locally stored at least portion of the first predetermined index 130 and retrieves the first module code location from there, provided that the locally stored at least portion of the first predetermined index 130 is not stale. If locally stored at least portion of the first predetermined index 130 is not available, or if the locally stored at least portion of the first predetermined index 130 is stale, the processor 128 addresses a remote information storage medium, where the first predetermined index 130 is located, and retrieves the first module code location from there.

Whether the processor 128 addresses the locally stored at least portion of the first predetermined index 130 or remotely stored first predetermined index 130, the processor 128 further retrieves information that execution of the first module code requires the second module code, and indication 320 of the second predetermined index 140 to be used to find a second module code location.

Then, the method 200 proceeds to the step 208.

Step 208—verifying whether a locally stored at least portion of the second predetermined index 140 is available, and if available, verifying if the locally stored at least portion of the second predetermined index 140 is stale Then, the processor 128 checks if a locally stored at least portion of the second predetermined index 140 is available.

If locally stored at least portion of the second predetermined index 140 is available, the processor 128 checks whether the locally stored at least portion of the second predetermined index 140 is stale or not. The processor 128 can perform verification in the same way as it was described with regard to verification of staleness of the at least portion of the first predetermined index 130, using the predetermined staleness threshold parameter indicating how long a locally stored at least portion of a predetermined index is deemed to be not stale, and using a time stamp of the at least portion of the second predetermined index 140.

Then, the method 200 proceeds to the step 210.

Step 210—retrieving, from the second predetermined index 140, the second module code reference 324

If locally stored at least portion of the second predetermined index 140 is available, the processor 128 addresses the locally stored at least portion of the second predetermined index 140 and retrieves the second module code location from there, provided that the locally stored at least portion of the second predetermined index 140 is not stale. If locally stored at least portion of the second predetermined index 140 is not available, or if it is stale, the processor 128 addresses a remote information storage medium, where the second predetermined index 140 is located, and retrieves the second module code location from there.

Whether the processor 128 addresses the locally stored at least portion of the second predetermined index 140 or remotely stored second predetermined index 140, the processor 128 can further retrieve information if execution of the second module code requires a fourth module code, and, if response is positive, can retrieve an indication of a fourth predetermined index to be used to find a fourth module code location.

Step 212—retrieving the first module code and the second module code, and executing the action by running the first module code and the second module code Having received all necessary module code locations, including the first module code location from the first predetermined index 130, and the second module code location from the second predetermined index 140, the computing device 122 can retrieve all necessary module codes and execute the action by running required module codes.

The method 200 then ends.

It should be mentioned that in some implementations of the method 200, the first predetermined index 130 and the second predetermined index 140 can be implemented as a single third predetermined index. In such a case, acquiring from any one, selected from: at least the portion of the first predetermined index 130 and at least the portion of the second predetermined index 140, can be implemented as acquiring from at least a portion of the third predetermined index. Such third predetermined index can be a remotely stored the third predetermined index or a locally stored at least a portion of the third predetermined index (either a modified version of at least the portion of the remotely stored the third predetermined index, or an exact copy of at least the portion of the remotely stored the third predetermined index). In other words, the method 200 can be executed where only one remote predetermined index exists. In this implementation, the computing device 122 can interact with one remote third predetermined index. The processor 128 can, however, before interacting with the third predetermined index, check availability and staleness of a local copy of at least portion of the third predetermined index.

From a certain perspective, embodiments of the present technology can be summarized as follows, structured in numbered clauses:

1. A computer-implemented method for loading module codes, the module codes required by a computing device for executing an action, the method executed on the computing device (122), the method comprising:

receiving, by the computing device (122), a request for executing the action, the action being executable using a first module code, a first module code reference (316) indicating a first module code location being recorded in a first predetermined index (130);

acquiring, from the first predetermined index (130):
  the first module code reference (316), the first module code reference (316) indicating the first module code location, and
  the indication (318) that executing the first module code requires a second module code, and
  an indication (320) of the second predetermined index (140), the second predetermined index (140) comprising a second module code reference (324), the second module code reference (324) indicating a second module code location, the second module code supporting execution of the first module code;

acquiring, from the second predetermined index (140), the second module code reference (324);

based on the first module code reference (316), acquiring the first module code from the first module code location;

based on the second module code reference (324), acquiring the second module code from the second module code location.

2. Method of clause 1, further comprising executing the action by running the first module code and the second module code.

3. Method of any one of clauses 1 to 2, further comprising storing, on the computing device (122), an indication 312 of the first predetermined index (130), the first predetermined index (130) comprising the first module code reference (316), the first module code reference (316) indicating the first module code location.

4. Method of any one of clauses 1 to 3, wherein
the first predetermined index (130) and the second predetermined index (140) are a part of a plurality of predetermined indexes, the plurality of predetermined indexes comprising one default index, the default index selected from: the first predetermined index (130) and the second predetermined index (140), the default index being stored on a default information storage medium; and wherein the indication of an index other than the default index is made by the indicator of that particular index other than the default index, referencing to a particular information storage medium other than the default information storage medium, and wherein an indication of the default index is made by any one, selected from:

an absence of an indicator of the predetermined index being the default index, the absence of the indicator being interpreted as a reference to the default information storage medium, and the indicator of that predetermined index being the default index, referencing to the default information storage medium.

5. Method of any one of clauses 1 to 4, wherein
the first predetermined index (130) is any one, selected from:
a remotely stored first predetermined index (130), and
a locally stored at least a portion of the first predetermined index (130), and
the second predetermined index (140) is any one, selected from:
a remotely stored second predetermined index (140), and
a locally stored at least a portion of the second predetermined index (140).

6. Method of clause 5, wherein
the locally stored at least the portion of the first predetermined index (130) is any one, selected from:
a modified version of at least the portion of the remotely stored first predetermined index (130) and
an exact copy of at least the portion of the remotely stored first predetermined index (130),
and
the locally stored at least the portion of the second predetermined index (140) is any one, selected from:
a modified version of at least the portion of the remotely stored second predetermined index (140) and
an exact copy of at least the portion of the remotely stored second predetermined index (140).

7. Method of any one of clauses 5 to 6, wherein,
before acquiring from at least the portion of the first predetermined index (130) any one of (i) the first module code reference (316), and (ii) the indication (320) of the second predetermined index (140), the method further comprises performing a verification whether the locally stored at least the portion of the first predetermined index (130) is available; and
responsive to the locally stored at least the portion of the first predetermined index (130) being available, the method further comprises using, by the computing device (122), one of: (i) the remotely stored first predetermined index (130) and (ii) the locally stored at least the portion of the first predetermined index (130), as a source of at least one, selected from:
the first module code reference (316),
the indication (320) of the second predetermined index (140); and
responsive to the locally stored at least the portion of the first predetermined index (130) being not available, the method further comprising using, by the computing device (122), the remotely stored first predetermined index (130) as a source of the first module code reference (316) and of the indication (320) of the second predetermined index (140).

8. Method of clause 7, wherein responsive to the locally stored at least the portion of the first predetermined index (130) being available, the using of one of: (i) the remotely stored first predetermined index (130) and (ii) the locally stored at least the portion of the first predetermined index (130), is performed after selecting respective one of: (i) the remotely stored first predetermined index (130) and (ii) the locally stored at least the portion of the first predetermined index (130), the selecting being executed by steps of:
determining a staleness parameter of the locally stored at least the portion of the first predetermined index (130),
comparing the staleness parameter of the locally stored at least the portion of the first predetermined index (130) with a predetermined staleness threshold parameter, the predetermined staleness threshold parameter indicative whether a locally stored at least portion of a respective index is stale, and
responsive to the staleness parameter of the locally stored at least the portion of the first predetermined index (130) exceeding the predetermined staleness threshold parameter, using the remotely stored first predetermined index (130) as the source of at least one, selected from: the first module code reference (316) and the indication (320) of the second predetermined index (140); and
responsive to the staleness parameter of the locally stored at least the portion of the first predetermined index (130) being below the predetermined staleness threshold parameter, using the locally stored at least the portion of the first predetermined index (130) as the source of at least one, selected from: the first module code reference (316) and the indication (320) of the second predetermined index (140).

9. Method of any one of clauses 5 to 8, wherein
the first module code location is any one, selected from: a local information storage medium and a remote information storage medium, and
the second module code location is any one, selected from: a local information storage medium and a remote information storage medium.

10. Method of clause 9, wherein the second module code location is the remote information storage medium, after acquiring the second module code from the second module code location, the method further comprises:
responsive to determining that at least the portion of the second predetermined index (140) is stored locally, modifying the locally stored at least the portion of the second predetermined index (140) such that the modified locally stored at least the portion of the second predetermined index (140) comprises the second module code reference (324) indicating a second module code location on the local information storage medium, and
responsive to determining the absence of the locally stored at least the portion of the second predetermined index (140), generating the modified version of at least the portion of the remotely stored second predetermined index (140), the modified version of at least the portion of the remotely stored second predetermined index (140) comprising the second module code reference (324) indicating the second module code location on the local information storage medium.

11. Method of any one of clauses 1 to 10, wherein the first predetermined index (130) and the second predetermined index (140) are implemented as a single third predetermined index, and wherein acquiring from any one, selected from: at least the portion of the first predetermined index (130) and at least the portion of the second predetermined index (140), is acquiring from at least a portion of the third predetermined index.

12. Method of clause 11, wherein the third predetermined index is any one, selected from: a remotely stored the third predetermined index, and a locally stored at least a portion of the third predetermined index.

13. Method of clause 12, wherein the locally stored at least the portion of the third predetermined index is any one, selected from:
a modified version of at least the portion of the remotely stored the third predetermined index, and
an exact copy of at least the portion of the remotely stored the third predetermined index.

14. Method of any one of clauses 1 to 13, wherein receiving, by the computing device (122), the request for the executing the action, is receiving the request initiated by a third module code.

15. Method of any one of clauses 1 to 13, wherein the computing device (122) is associated with a user, and wherein receiving, by the computing device (122), the request for the executing the action, is receiving from the user.

16. A computing device having an information storage medium, and a processor coupled to the information storage medium, the processor being configured to have access to computer readable commands which commands, when executed, cause the processor to perform:
receiving, by the computing device (122), a request for executing the action, the action being executable using a first module code, a first module code reference (316) indicating a first module code location being recorded in a first predetermined index (130);
acquiring, from the first predetermined index (130):
- the first module code reference (316), the first module code reference (316) indicating the first module code location, and
- the indication (318) that executing the first module code requires a second module code, and
- an indication (320) of the second predetermined index (140), the second predetermined index (140) comprising a second module code reference (324), the second module code reference (324) indicating a second module code location, the second module code supporting execution of the first module code;

acquiring, from the second predetermined index (140), the second module code reference (324);
based on the first module code reference (316), acquiring the first module code from the first module code location;
based on the second module code reference (324), acquiring the second module code from the second module code location.

17. The computing device (122) of clause 16, wherein the processor is further configured to execute the action by running the first module code and the second module code.

18. The computing device (122) of any one of clauses 16 to 17, wherein the processor is further configured to store, on the computing device (122), an indication 312 of the first predetermined index (130), the first predetermined index (130) comprising the first module code reference (316), the first module code reference (316) indicating the first module code location.

19. The computing device (122) of any one of clauses 16 to 18, wherein
the first predetermined index (130) and the second predetermined index (140) are a part of a plurality of predetermined indexes, the plurality of predetermined indexes comprising one default index, the default index selected from: the first predetermined index (130) and the second predetermined index (140), the default index being stored on a default information storage medium; and wherein
the indication of an index other than the default index is made by the indicator of that particular index other than the default index, referencing to a particular information storage medium other than the default information storage medium, and wherein
an indication of the default index is made by any one, selected from:
- an absence of an indicator of the predetermined index being the default index, the absence of the indicator being interpreted as a reference to the default information storage medium, and
- the indicator of that predetermined index being the default index, referencing to the default information storage medium.

20. The computing device (122) of any one of clauses 16 to 19, wherein
the first predetermined index (130) is any one, selected from:
- a remotely stored first predetermined index (130), and
- a locally stored at least a portion of the first predetermined index (130), and the second predetermined index (140) is any one, selected from:
- a remotely stored second predetermined index (140), and
- a locally stored at least a portion of the second predetermined index (140).

21. The computing device (122) of clause 20, wherein the locally stored at least the portion of the first predetermined index (130) is any one, selected from:
- a modified version of at least the portion of the remotely stored first predetermined index (130) and
- an exact copy of at least the portion of the remotely stored first predetermined index (130), and
the locally stored at least the portion of the second predetermined index (140) is any one, selected from:
- a modified version of at least the portion of the remotely stored second predetermined index (140) and
- an exact copy of at least the portion of the remotely stored second predetermined index (140).

22. The computing device (122) of any one of clauses 20 to 21, wherein the processor is further configured
before acquiring from at least the portion of the first predetermined index (130) any one of (i) the first module code reference (316), and (ii) the indication (320) of the second predetermined index (140), to perform a verification whether the locally stored at least the portion of the first predetermined index (130) is available; and
responsive to the locally stored at least the portion of the first predetermined index (130) being available, to use one of: (i) the remotely stored first predetermined index (130) and (ii) the locally stored at least the portion of the first predetermined index (130), as a source of at least one, selected from:
- the first module code reference (316),
- the indication (320) of the second predetermined index (140); and responsive to the locally stored at least the portion of the first predetermined index (130) being not available, to use the remotely stored first predetermined index (130) as a source of the first module code reference (316) and of the indication (320) of the second predetermined index (140).

23. The computing device (122) of clause 22, wherein responsive to the locally stored at least the portion of the first predetermined index (130) being available, the using of one of: (i) the remotely stored first predetermined index (130) and (ii) the locally stored at least the portion of the first predetermined index (130), is performed after selecting respective one of: (i) the remotely stored first predetermined index (130) and (ii) the locally stored at least the portion of the first predetermined index (130), the selecting being executed by steps of:
determining a staleness parameter of the locally stored at least the portion of the first predetermined index (130),
comparing the staleness parameter of the locally stored at least the portion of the first predetermined index (130) with a predetermined staleness threshold parameter, the predetermined staleness threshold parameter indicative whether a locally stored at least portion of a respective index is stale, and responsive to the staleness parameter of the locally stored at least the portion of the first predetermined index (130) exceeding the predetermined staleness threshold parameter, using the remotely stored first predetermined index (130) as the source of at least one, selected from: the first module code reference (316) and the indication (320) of the second predetermined index (140); and responsive to the staleness parameter of the locally stored at least the portion of the first predetermined index (130) being below the predetermined staleness threshold parameter, using the locally stored at least the portion of the first predetermined index (130) as the source of at least one, selected from: the first module code reference (316) and the indication (320) of the second predetermined index (140).

24. The computing device (122) of clause 20 to 23, wherein the first module code location is any one, selected from: a local information storage medium and a remote information storage medium, and the second module code location is any one, selected from: a local information storage medium and a remote information storage medium.

25. The computing device (122) of clause 24, wherein the second module code location is the remote information storage medium, after acquiring the second module code from the second module code location, the processor is further configured:

responsive to determining that at least the portion of the second predetermined index (140) is stored locally, to modify the locally stored at least the portion of the second predetermined index (140) such that the modified locally stored at least the portion of the second predetermined index (140) comprises the second module code reference (324) indicating a second module code location on the local information storage medium, and responsive to determining the absence of the locally stored at least the portion of the second predetermined index (140), to generate the modified version of at least the portion of the remotely stored second predetermined index (140), the modified version of at least the portion of the remotely stored second predetermined index (140) comprising the second module code reference (324) indicating the second module code location on the local information storage medium.

26. The computing device (122) of any one of clauses 16 to 25, wherein the first predetermined index (130) and the second predetermined index (140) are implemented as a single third predetermined index, and wherein acquiring from any one, selected from: at least the portion of the first predetermined index (130) and at least the portion of the second predetermined index (140), is acquiring from at least a portion of the third predetermined index.

27. The computing device (122) of clause 26, wherein the third predetermined index is any one, selected from: a remotely stored the third predetermined index, and a locally stored at least a portion of the third predetermined index.

28. The computing device (122) of clause 27, wherein the locally stored at least the portion of the third predetermined index is any one, selected from:

a modified version of at least the portion of the remotely stored the third predetermined index, and an exact copy of at least the portion of the remotely stored the third predetermined index.

29. The computing device (122) of any one of clauses 16 to 28, wherein receiving, by the computing device (122), the request for the executing the action, is receiving the request initiated by a third module code.

30. The computing device (122) of any one of clauses 16 to 28, wherein the computing device (122) is associated with a user, and wherein receiving, by the computing device (122), the request for the executing the action, is receiving from the user.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for loading module codes, the module codes required by a computing device for executing an action, the method executed on the computing device, the computing device being coupled to a plurality of predetermined indexes comprising a first predetermined index, a second predetermined index and a default index;

the method comprising:
  receiving, by the computing device, a request for executing the action, the action being executable using a first module code, and an indication of a first index associated with the action;
  responsive to the request for executing the action, determining if the first index corresponds to the first predetermined index;
  responsive to the first index corresponding to the first predetermined index, acquiring, from the first predetermined index:
    a first module code reference, the first module code reference indicating a first module code location; and
    an indication that executing the first module code requires a second module code;
    an indication of a second index, the second index comprising a second module code reference, the second module code reference indicating a second module code location, the second module code supporting execution of the first module code;
  responsive to the first index not corresponding to the first predetermined index, acquiring, from the default index:
    the first module code reference;
    the indication that executing the first module code requires a second module code;
    the indication of the second index;
  determining if the second index corresponds to the second predetermined index;
    in response to the second index corresponding to the second predetermined index, acquiring, from the second predetermined index, the second module code reference;

in response to the second index not corresponding to the second predetermined index, acquiring, from the default index, the second module code reference;

based on the first module code reference, acquiring the first module code from the first module code location;

based on the second module code reference, acquiring the second module code from the second module code location; and responsive to the presence of the first module code and the second module code, executing the action by running the first module code and the second module code.

2. The method of claim 1, further comprising storing, on the computing device, an indication of the first predetermined index, the first predetermined index comprising the first module code reference, the first module code reference indicating the first module code location.

3. The method of claim 1, wherein
the first predetermined index is any one, selected from:
a remotely stored first predetermined index;
a locally stored at least a portion of the first predetermined index;
the second predetermined index is any one, selected from:
a remotely stored second predetermined index; and
a locally stored at least a portion of the second predetermined index.

4. The method of claim 3, wherein
the locally stored at least the portion of the first predetermined index is any one, selected from:
a modified version of at least the portion of the remotely stored first predetermined index;
an exact copy of at least the portion of the remotely stored first predetermined index; and
the locally stored at least the portion of the second predetermined index is any one, selected from:
a modified version of at least the portion of the remotely stored second predetermined index; and
an exact copy of at least the portion of the remotely stored second predetermined index.

5. The method of claim 3, wherein
before acquiring from at least the portion of the first predetermined index any one of (i) the first module code reference, and (ii) the indication of the second predetermined index, the method further comprises performing a verification whether the locally stored at least the portion of the first predetermined index is available; and
responsive to the locally stored at least the portion of the first predetermined index being available, the method further comprises using, by the computing device, one of: (i) the remotely stored first predetermined index and (ii) the locally stored at least the portion of the first predetermined index, as a source of at least one, selected from:
the first module code reference;
the indication of the second predetermined index; and
responsive to the locally stored at least the portion of the first predetermined index being not available, the method further comprises using, by the computing device, the remotely stored first predetermined index as a source of the first module code reference and of the indication of the second predetermined index.

6. The method of claim 5, wherein responsive to the locally stored at least the portion of the first predetermined index being available, the using of one of: (i) the remotely stored first predetermined index and (ii) the locally stored at least the portion of the first predetermined index, is performed after selecting respective one of: (i) the remotely stored first predetermined index and (ii) the locally stored at least the portion of the first predetermined index, the selecting being executed by steps of:

determining a staleness parameter of the locally stored at least the portion of the first predetermined index;

comparing the staleness parameter of the locally stored at least the portion of the first predetermined index with a predetermined staleness threshold parameter, the predetermined staleness threshold parameter indicative whether a locally stored at least portion of a respective index is stale; and responsive to the staleness parameter of the locally stored at least the portion of the first predetermined index exceeding the predetermined staleness threshold parameter, using the remotely stored first predetermined index as the source of at least one, selected from: the first module code reference and the indication of the second predetermined index; and responsive to the staleness parameter of the locally stored at least the portion of the first predetermined index being below the predetermined staleness threshold parameter, using the locally stored at least the portion of the first predetermined index as the source of at least one, selected from: the first module code reference and the indication of the second predetermined index.

7. The method of claim 3, wherein
the first module code location is any one, selected from:
a local information storage medium; and
a remote information storage medium, and
the second module code location is any one, selected from:
a local information storage medium; and
a remote information storage medium.

8. The method of claim 7, wherein the second module code location is the remote information storage medium, after acquiring the second module code from the second module code location, the method further comprises:

responsive to determining that at least the portion of the second predetermined index is stored locally, modifying the locally stored at least the portion of the second predetermined index such that the modified locally stored at least the portion of the second predetermined index comprises the second module code reference indicating a second module code location on the local information storage medium; and responsive to determining the absence of the locally stored at least the portion of the second predetermined index, generating the modified version of at least the portion of the remotely stored second predetermined index, the modified version of at least the portion of the remotely stored second predetermined index comprising the second module code reference indicating the second module code location on the local information storage medium.

9. The method of claim 1, wherein the first predetermined index and the second predetermined index are implemented as a single third predetermined index, and wherein acquiring any one, selected from: at least the portion of the first predetermined index and at least the portion of the second predetermined index comprises acquiring from at least a portion of the third predetermined index.

10. The method of claim 9, wherein the third predetermined index is any one, selected from: a remotely stored the third predetermined index, and a locally stored at least a portion of the third predetermined index.

11. The method of claim 10, wherein the locally stored at least the portion of the third predetermined index is any one, selected from:
a modified version of at least the portion of the remotely stored the third predetermined index; and
an exact copy of at least the portion of the remotely stored the third predetermined index.

12. The method of claim 1, wherein receiving, by the computing device, the request for the executing the action, is receiving the request initiated by a third module code.

13. The method of claim 1, wherein the computing device is associated with a user, and wherein receiving, by the computing device, the request for the executing the action, is receiving from the user.

14. A computing device having an information storage medium, and a processor coupled to the information storage medium,
the computing device being coupled to a plurality of predetermined indexes comprising a first predetermined index, a second predetermined index and a default index;
the processor being configured to have access to computer readable commands which commands, when executed, cause the processor to:
receive, by the computing device, a request for executing the action, the action being executable using a first module code, and an indication of a first index associated with the action;
responsive to the request for executing the action, determine if the first index corresponds to the first predetermined index;
responsive to the first index corresponding to the first predetermined index, acquire, from the first predetermined index:
a first module code reference, the first module code reference indicating the first module code location;
an indication that executing the first module code requires a second module code;
an indication of a second predetermined index, the second predetermined index comprising a second module code reference, the second module code reference indicating a second module code location, the second module code supporting execution of the first module code;
responsive to the first index not corresponding to the first predetermined index, acquire, from the default index:
the first module code reference;
the indication that executing the first module code requires the second module code;
the indication of the second predetermined index;
determine if the second index corresponds to the second predetermined index;
in response to the second index corresponding to the second predetermined index, acquire, from the second predetermined index, the second module code reference;
in response to the second index not corresponding to the second predetermined index, acquire, from the default index, the second module code reference;
based on the first module code reference, acquire the first module code from the first module code location;
based on the second module code reference, acquire the second module code from the second module code location; and
responsive to the presence of the first module code and the second module code, execute the action by running the first module code and the second module code.

15. The computing device of claim 14, wherein the processor is further configured to store, on the computing device, an indication of the first predetermined index, the first predetermined index comprising the first module code reference, the first module code reference indicating the first module code location.

16. The computing device of claim 14, wherein
the first predetermined index is any one, selected from:
a remotely stored first predetermined index; and
a locally stored at least a portion of the first predetermined index; and
the second predetermined index is any one, selected from:
a remotely stored second predetermined index; and
a locally stored at least a portion of the second predetermined index.

17. The computing device of claim 16, wherein
the locally stored at least the portion of the first predetermined index is any one, selected from:
a modified version of at least the portion of the remotely stored first predetermined index;
an exact copy of at least the portion of the remotely stored first predetermined index;
the locally stored at least the portion of the second predetermined index is any one, selected from:
a modified version of at least the portion of the remotely stored second predetermined index; and
an exact copy of at least the portion of the remotely stored second predetermined index.

18. The computing device of claim 16, wherein,
before acquiring from at least the portion of the first predetermined index any one of (i) the first module code reference, and (ii) the indication of the second predetermined index, the processor is further configured to execute a verification whether the locally stored at least the portion of the first predetermined index is available; and
responsive to the locally stored at least the portion of the first predetermined index being available, the processor is further configured to use one of: (i) the remotely stored first predetermined index and (ii) the locally stored at least the portion of the first predetermined index, as a source of at least one, selected from:
the first module code reference;
the indication of the second predetermined index; and
responsive to the locally stored at least the portion of the first predetermined index being not available, the processor is further configured to use the remotely stored first predetermined index as a source of the first module code reference and of the indication of the second predetermined index.

19. The computing device of claim 16, wherein
the first module code location is any one, selected from:
a local information storage medium; and
a remote information storage medium, and
the second module code location is any one, selected from:
a local information storage medium; and
a remote information storage medium.

20. The computing device of claim 19, wherein the second module code location is the remote information storage medium, after acquiring the second module code from the second module code location, the processor further configured to:

responsive to determining that at least the portion of the second predetermined index is stored locally, modify the locally stored at least the portion of the second predetermined index such that the modified locally stored at least the portion of the second predetermined index comprises the second module code reference indicating a second module code location on the local information storage medium, and responsive to determining the absence of the locally stored at least the portion of the second predetermined index, generate the modified version of at least the portion of the remotely stored second predetermined index, the modified version of at least the portion of the remotely stored second predetermined index comprising the second module code reference indicating the second module code location on the local information storage medium.

* * * * *